(12) United States Patent
Yu (10) Patent No.: US 8,145,059 B2
(45) Date of Patent: Mar. 27, 2012

(54) CIRCUIT TOPOLOGIES FOR HIGH SPEED, LOW COST OPTICAL TRANSCEIVER COMPONENTS

(75) Inventor: Ruai Yu, Newbury Park, CA (US)

(73) Assignee: GTran Corporation, Camarillo, CA (US)

(*) Notice: Subject to any disclaimer, the term of this patent is extended or adjusted under 35 U.S.C. 154(b) by 929 days.

(21) Appl. No.: 12/074,239

(22) Filed: Feb. 28, 2008

(65) Prior Publication Data

US 2009/0220245 A1     Sep. 3, 2009

(51) Int. Cl.
*H04B 10/00* (2006.01)

(52) U.S. Cl. ........ 398/136; 398/135; 398/138; 398/139; 398/140; 398/154; 398/155; 398/158; 398/159; 398/192; 398/208

(58) Field of Classification Search .......... 398/135–140, 398/154, 155, 158, 159, 192, 208
See application file for complete search history.

(56) References Cited

U.S. PATENT DOCUMENTS

| 2004/0076113 A1* | 4/2004 | Aronson et al. | 370/217 |
| 2006/0067711 A1* | 3/2006 | Schulz | 398/202 |

OTHER PUBLICATIONS

Scavennec et al: "40 Gbit/s transmission: III-V integrated circuits for opto-electronic interfaces", Annals of Telecommunications, vol. 59, No. 9-10, 2003, pp. 1485-1503.*
Suzuki et al: "A 50-Gbit/s 450-mW Full-Rate 4:1 Multiplexer With Multiphase Clock Architecture in 0.13-mm InP HEMT Technology", IEEE J. Solid-State Circuits, vol. 42, No. 3, Mar. 2007, pp. 637-646.*

\* cited by examiner

*Primary Examiner* — Li Liu
(74) *Attorney, Agent, or Firm* — GSS Law Group (57) ABSTRACT

A topology for optical transceiver components comprises an electrical signal interface stage, a data timing and signal reformatting stage, and an optical fiber interface stage. Unlike transceiver components known in the art, functions having signals with the most jitter are partitioned into the electrical signal interface stage. Data timing functions, for example retiming or clock and data recovery, are included in the data timing and reformatting stage. Output jitter from the data timing and signal reformatting stage is approximately equal to jitter in a clock signal, enabling use of semiconductor components having jitter greater than SONET limits and thereby increasing a value of production yield. Embodiments of the invention are well suited for 40 G transmitters and receivers in nonconnectorized surface mount packages. 40 G transceivers built in accord with the invention are expected to have lower cost, smaller size, and higher production yield than 40 G transceivers known in the art.

18 Claims, 6 Drawing Sheets

CIRCUIT TOPOLOGIES FOR HIGH SPEED, LOW COST OPTICAL TRANSCEIVER COMPONENTS

FIELD OF THE INVENTION

The present invention is generally directed to a transceiver for communicating over a fiber optic network and more specifically to a circuit topology for components used in optical transceivers for SONET networks.

BACKGROUND

In some communication systems, a transmitting device sends data to a receiving device by sending light signals representing the data through an interconnecting optical fiber. Data to be sent over an optical fiber may first be represented by digital electrical signals which are converted to corresponding modulated light signals. The modulated light signals travel through the optical fiber to one or more receiving devices. A receiving device detects modulated light signals passing through the optical fiber, converts the modulated light signals into digital electrical signals, and sends the digital electrical signals to other parts of the communication system.

A transceiver is a combination of a transmitting device and a receiving device. The transmitting device, also referred to as a transmitter, converts input electrical signals comprising data to be sent through the network to a signal that is compatible with the physical medium of the network. For example, the transmitter in an optical transceiver converts input electrical signals into modulated light signals for output to an optical fiber. The receiving device, also referred to as the receiver, detects signals carried by the physical medium of the network and adapts the signals for output to other devices connected to the transceiver. In the example of the optical transceiver, the receiver detects light signals from an optical fiber and converts the light signals into electrical signals representing data received from the network.

In order to facilitate interoperability over a network comprising equipment from different suppliers, transceivers may be required to send and receive signals having signal parameters in accord with a telecommunications standard. One such standard is the Synchronous Optical Network (SONET) standard, published by the Exchange Carriers Standards Association for the American National Standards Institute. The SONET standard includes requirements for signals to be exchanged over a network having optical fibers as the physical medium of the network, more commonly known as a fiber optic network.

In SONET and some other networks, data is transmitted serially without an accompanying clock signal. A clock signal is a means of establishing a common time reference for actions in different parts of a system. As signals corresponding to data pass into and through the transmitter portion of a first optical transceiver, over an optical fiber, and into and through the receiver portion of a second optical transceiver located some distance from the first transceiver, amplitude, timing, and phase errors may be introduced into the signals. These errors may introduce uncertainty into the measurement of timing parameters used to recover data from the signal received by the second transceiver. For example, the errors may cause unwanted variations in time intervals and durations used to convert signal pulses to data bits. Such unwanted variations in signal parameters related to timing are referred to as jitter. Jitter may cause output data from the second optical transceiver to differ from input data to the first optical transceiver, which may result in a network transmission error.

To avoid this undesirable result, the SONET standard includes specifications related to a maximum value of jitter that may be introduced into signals transmitted over the network by devices connected to the network. Standards other than SONET may also include specifications related to jitter limits.

Optical transceivers are among the devices that operate within jitter limits expressed in the SONET standard. The parts of an optical transceiver contributing the most jitter to transceiver output signals are the multiplexer (MUX) and demultiplexer (DMUX) circuits. A MUX merges n parallel data input lines, each input line having a data rate of m bits per second, into a serial data output line have a data rate of n×m bits per second. A MUX is sometimes referred to as a serializer. A DMUX is complementary to a MUX, forming n parallel data output lines, each parallel output line having a data rate of m bits per second, from a serial data input line having a data rate of n×m bits per second. A DMUX is sometimes referred to as a deserializer. In an optical transceiver, a mux is generally part of the transmitter and a DMUX is generally part of the receiver.

Many high speed optical transceivers include components fabricated using semiconductor processes such as silicon CMOS and silicon-germanium (SiGe) BiCMOS technologies. For an optical transceiver adapted for data rates up to 10 gigabits per second (Gbps), also referred to as a 10 G transceiver, jitter from transceiver components fabricated from these processes generally does not exceed SONET limits. However, circuits fabricated from these processes tend to have increased jitter at data rates above 10 Gbps. For example, it is not unexpected that about half the number of transceiver components made from these processes will be unusable in 40 Gbps transceivers due to jitter measurements in excess of SONET jitter limits.

Figure 1:
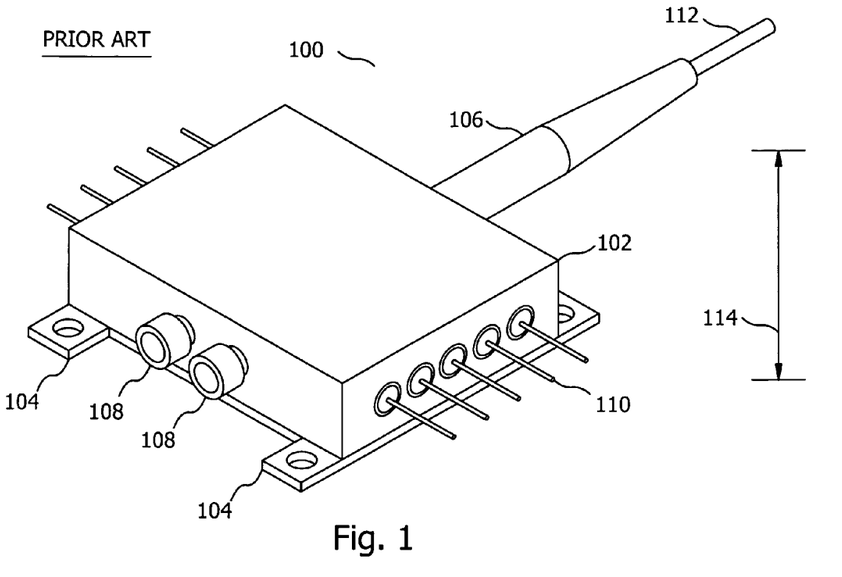

In addition to jitter originating within semiconductor components, conducted and radiated noise from sources external to the transceiver may interact with transceiver circuits and contribute to jitter measured at the transceiver's outputs. Some optical transceivers use components having special packaging to shield internal circuits from noise and reduce jitter in transceiver outputs. FIG. 1 illustrates an example of a packaged transceiver component, in this case a receiver. FIG. 1 is an example of a receiver adapted for operation at data rates up to 40 Gbps, also known as a 40 G receiver, for use in a 40 Gbps transceiver. FIG. 1 is also representative of packaging for other 40 Gbps transceiver components known in the art, for example a transmitter, modulator driver, optical modulator, or optical receiver. As shown in FIG. 1, the prior art packaged 40 G receiver 100 is enclosed in a machined metal enclosure 102. An enclosure 102 having one or more shielded connectors 108 is known in the art as a connectorized package. A butterfly package is another metal package similar to FIG. 1. Generally, laser diodes have butterfly packages. Because of its relatively large size and weight, the metal enclosure 102 of FIG. 1 includes mounting flanges 104 for attaching the 40 G receiver 100 to a circuit card assembly with mechanical fasteners such as bolts or rivets. A mechanical fastener may also be used to establish a ground connection between a mounting flange 104 and the circuit card assembly.

One or more shielded connectors 108, which may be of a type referred to as V connectors, GPPO connectors, or similar connectors for high-frequency signals, are used to connect a shielded cable assembly carrying high-frequency signals to the packaged 40 G receiver 100. A plurality of electrical contacts 110 are used for low-speed signal, direct current (DC) power, and ground connections between components inside the packaged 40 G receiver 100 and an external circuit card assembly. Electrical contacts 110 are electrically isolated from the metal housing 102 by insulators made of ceramic or some other electrical insulator. A fiber optic cable 112, a short piece of which is shown in FIG. 1, connects from a communication network to the receiver 100 through a fiber optic connector and strain relief 106. The fiber optic cable, which comprises an optical fiber for carrying optical signals, is part of the communication network and is not part of the transceiver comprising the receiver 100.

Connectorized and butterfly packages are expensive to manufacture and install, especially in comparison to surface mount packages. Furthermore, shielded connectors can exacerbate jitter problems and may cause other problems such as signal attenuation, reflections, and reduced system reliability. Shielded cable assemblies for electrical signal connections between components having connectorized packages are bulky, require manual assembly into the transceiver, and may be about as expensive as the components they connect. For a connectorized package having a pair of shielded connectors 108 for connection of a differential signal, as in FIG. 1, two shielded cables are required for signal connections to the receiver 100, raising space requirements and installed costs even more.

Figure 3:
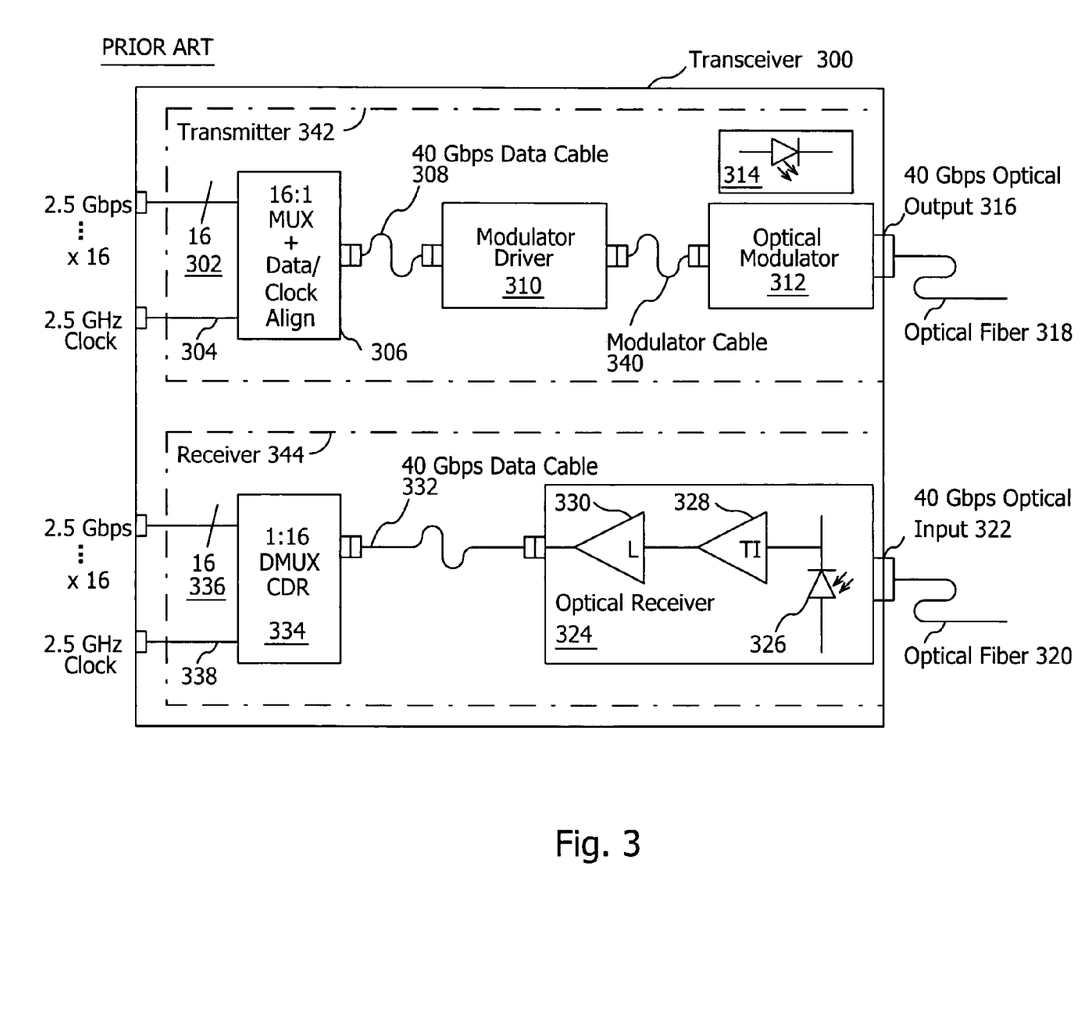
FIG. 3 is block diagram of a 40 G transceiver known in the art. (PRIOR ART).

FIG. 3 is a block diagram of an example of a 40 Gbps optical transceiver known in the art. The 40 Gbps optical transceiver 300, also known as a 40 G transceiver 300, comprises a transmitter 342 and a receiver 344. The transmitter 342 of 40 G transceiver 300 comprises a MUX 306 for merging data on sixteen parallel transceiver input data lines 302, aligning the serialized data with a transceiver input clock signal 304, and producing a serial 40 Gbps output data signal carried on a data cable 308 attached to an output from the connectorized MUX 306 package. The serial data output signal from the MUX 306 on the 40 Gbps data cable 308 includes jitter introduced by the MUX, connectors, cables, and external noise sources. In some cases, jitter from the MUX 306, which may be made from SiGe BiCMOS technologies for 40 Gbps operation, may comprise about 80% of the total jitter measured at an optical output of the prior-art transceiver 300.

Figure 4:
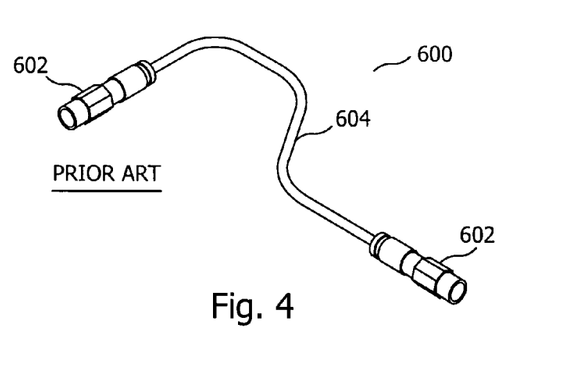
FIG. 4 is a pictorial view of a shielded cable assembly for connecting a high frequency signal to a connectorized package (PRIOR ART).

An example of a shielded cable assembly for high frequency electrical signal connections to shielded connectors is shown in FIG. 4. The shielded cable assembly 600 of FIG. 4 comprises two metal connectors 602 attached to a cable 604. One shielded cable assembly 600 is used for each electrical signal coupled between shielded connectors on connectorized packages. FIG. 4 is representative of the 40 Gbps data cable 308, the modulator cable 340, and a second 40 Gbps data cable 332 used in the receiver 344 (see below).

The optical modulator 312 of FIG. 3 modulates light output from a laser diode 314 to create an optical signal that is coupled into a 40 Gbps optical output 316 and then into an optical fiber 318. In some transceivers, the optical modulator 312 and the laser diode 314 are replaced with an electro-absorptive modulator laser (EML), a device which outputs an intensity-modulated light signal in response to a modulated input voltage. The 40 Gbps optical signal at an optical output 316 and then entering an optical fiber 318 comprises data to be transmitted and jitter accumulated from the MUX 306, the modulator driver 310, the optical modulator 312, plus jitter accumulated from the various connectors and cable assemblies along a signal path from an input to an output of the prior-art transceiver 300.

The receiver portion of 40 G transceiver 300 in FIG. 3 comprises optical receiver 324 and a device 334 which combines a 1:16 DMUX and a Clock and Data Recovery (CDR) function in one package. A CDR forms a clock signal from timing information extracted from a data signal in a data line. A 40 Gbps input signal comprising data to be received is carried through an optical fiber 320 coupled into a 40 Gbps optical input 322 on the transceiver 300. The optical receiver 324 is in a connectorized package comprising a photodetector 326, a transimpedance amplifier 328, and a limiting amplifier 330. The optical receiver 324 receives light signals from the 40 Gbps optical input 322 and outputs a digital electrical signal comprising serial data having a data rate of 40 Gbps on a 40 Gbps data cable 332 connected to an input of 1:16 DMUX CDR 334, also in a connectorized package. The 1:16 DMUX CDR 334 converts the 40 Gbps serial data input to sixteen parallel data outputs 336, each output carrying digital data at a date rate of 2.5 Gbps and jitter added to the data signal by the optical receiver 324, the DMUX CDR 334, and connectors and shielded cable assemblies linking the connectorized packages for the DMUX CDR and optical receiver. For a DMUX CDR 334, a substantial amount of jitter may be added to the sixteen 2.5 Gbps outputs 336 from the 40 G transceiver 300. For transceiver components known in the art, such as the receiver 344 and the transmitter 342 of FIG. 3, jitter is cumulative along a signal path from an input to an output.

Components for optical transceivers for use in SONET networks are routinely tested to reject units that do not meet jitter specifications. For example, MUX and DMUX, devices are screened for acceptable levels of jitter before the devices are installed in prior-art transceivers. As previously noted, production yields for some components used in prior-art 40 G transceivers are about fifty per cent, a figure determined mostly by MUX and DMUX devices having measured jitter in excess of a selected test limit. Yield figures may be improved incrementally by using connectorized packages and shielded cable assemblies, but these solutions have other problems as previously described.

What is needed is a circuit topology for 40 G transceiver components that is relatively insensitive to jitter from semiconductor devices, enabling transceivers to be built from components having jitter in excess of SONET jitter limits. Additionally, what is needed is a topology for transceiver components that have SONET-compliant outputs but do not have connectorized packages, shielded connectors, or shielded cable assemblies for interconnections between components.

SUMMARY

Embodiments of the invention comprise a topology for components for an optical transceiver adapted for operation in, but not limited to, SONET fiber optic networks having data transfer rates of 40 Gbps or more. Jitter on some signals in a 40 G component built in accord with an embodiment of the invention is approximately equal to jitter in a clock signal used by a retiming circuit that is part of a modulator driver and, unlike 40 G transceivers known in the art, is essentially independent of jitter from MUX, DMUX, or other transceiver components. As a result, components having a topology in accord with an embodiment of the invention are expected to have substantially higher production yields than 40 G components known in the art. A further benefit arising from a relative insensitivity to jitter is the replacement of connectorized packages, connectorized butterfly packages, and shielded cable assemblies with smaller, nonconnectorized surface mount packages adapted for connection to other transceiver components in surface mount packages by conductors on a circuit card assembly. Manufacturing and installed costs are therefore expected to be substantially lower than for 40 G transceivers known in the art.

A 40 G component having a topology in accord with the invention comprises an electrical signal interface stage having sixteen 2.5 Gbps parallel data lines, a 2.5 GHz clock line, a 40 Gbps serial data line, and a 20 GHz clock line. The parallel data lines and 2.5 GHz clock line are connected to external devices. The 40 Gbps serial data line and 20 GHz clock line are connected to a data timing and reformatting stage. The data timing and reformatting stage modifies signals passing through it to reduce an amount of jitter to a value approximately the same as jitter on the 20 GHz clock signal line. The data timing and reformatting stage 512 further modifies signals passing through it to make the signals compatible with other components connected to the data timing and reformatting stage. An optical fiber interface stage is connected to the data timing and reformatting stage by a signal line. In some embodiments, the optical fiber interface stage converts an electrical signal representative of 40 Gbps serial data to an optical signal. In other embodiments, the optical fiber interface stage converts an optical signal representative of 40 Gbps serial data to a corresponding electrical signal. In some embodiments, the 2.5 Gbps parallel data lines are input lines, the optical signal is an output signal, and the optical transceiver component is a transmitter. In other embodiments, the 2.5 Gbps parallel electrical signal data lines 502 are output lines, the optical signal is an input signal, and the optical transceiver component is a receiver.

This section summarizes some features of the present embodiment. These and other features, aspects, and advantages of the embodiments of the invention will become better understood with regard to the following description and upon reference to the following drawings, wherein:

BRIEF DESCRIPTION OF THE DRAWINGS

FIG. 1 is a pictorial view of a 40 G receiver known in the art. FIG. 1 is representative of packaging used for several different 40 G transceiver components known in the art. (PRIOR ART).

DESCRIPTION

Embodiments of the invention comprise a topology for a 40 G transceiver component having an electrical signal interface stage, an intermediate data timing and signal reformatting stage, and an optical fiber interface stage. In comparison to topologies known in the art which locate data timing and clock and data recovery functions in an electrical signal interface stage and therefore use semiconductor components screened for excessive output jitter, embodiments of the invention bring data retiming and data recovery functions and a clock signal into the data timing and reformatting stage. This repartitioning of data retiming and recovery functions, together with the clock signal, prevents jitter from an input stage from propagating to an output stage.

40 G transceiver components having a topology in accord with an embodiment of the invention may optionally use semiconductor components with jitter values that are substantially greater than jitter values for corresponding components used in transceivers known in the art, effectively increasing a yield figure for a quantity of 40 G semiconductor components usable in 40 G transceivers. A transceiver component made in accord with the invention may be fabricated in a small package without shielded connectors, referred to herein as a nonconnectorized package. A surface mount package is an example of a nonconnectorized package that may be used with embodiments of the invention. Furthermore, connections between components in a transceiver made in accord with the invention may be made with conductors on circuit card assemblies, in contrast to the shielded cable assemblies used for corresponding connections among transceiver components known in the art. Embodiments of the invention are well suited for optical transceiver components such as, but not limited to, transmitters and receivers, and are expected to have substantially lower manufacturing and installed costs compared to transceivers and transceiver components known in the art.

Figure 5:
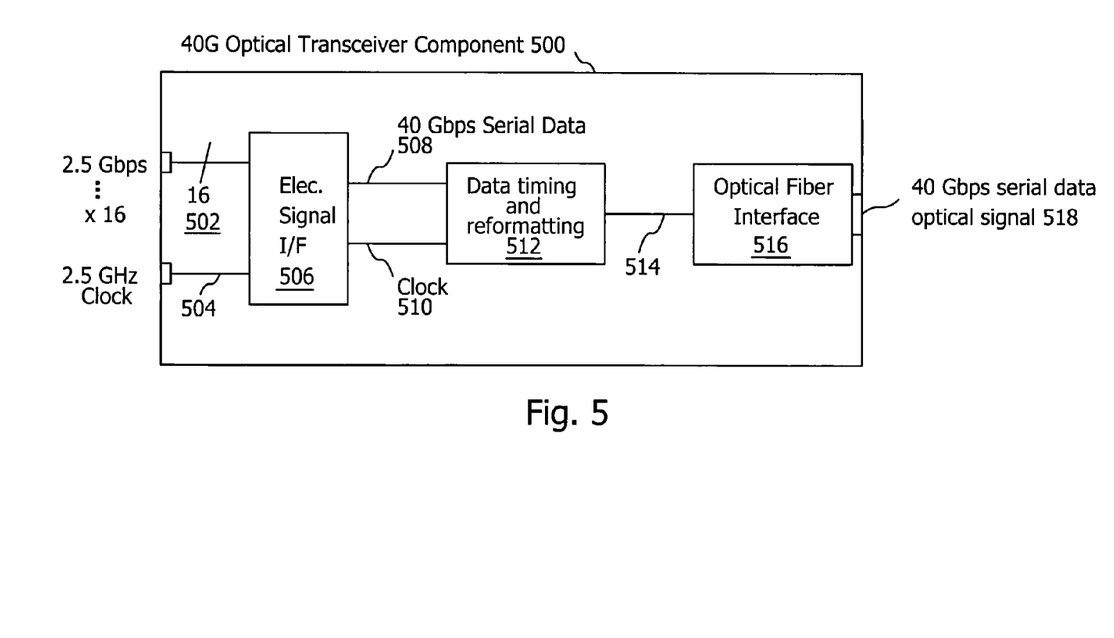
FIG. 5 is a block diagram representing circuit topology for an embodiment of the invention.

An embodiment of the invention is shown in FIG. 5 as a block diagram representing a circuit topology for a 40 G optical transceiver component. The 40 G optical transceiver component 500 comprises sixteen parallel electrical signal data lines 502, each line carrying digital data at a data rate of 2.5 Gbps, connected to an electrical signal interface stage 506. A 2.5 GHz clock signal line 504 is also connected to the electrical signal interface stage 506. The electrical signal interface stage 506 may have relatively high values of signal jitter on some signal lines. A clock line 510 connected to the electrical signal interface stage 506 has a relatively small amount of jitter compared to jitter in some signal lines.

A 40 Gbps serial data signal line 508 and the clock line 510 connect to the electrical signal interface stage 506 and to a data timing and reformatting stage 512. The data timing and reformatting stage 512 modifies signals passing through it to reduce an amount of jitter to a value approximately the same as jitter on a clock signal in the clock line 510. The data timing and reformatting stage 512 further modifies signals passing through it to make the signals compatible with other components connected to the data timing and reformatting stage 512. Some examples of signal modifications performed by the data timing and reformatting stage include, but are not limited to, amplification, cross point adjustment, and DC level shift.

A line 514 connected to the data timing and reformatting stage 512 and to an optical fiber interface stage 516 carries a signal representative of 40 Gbps serial data. In some embodiments the signal on the line 514 is an analog signal. In some embodiments, the optical fiber interface stage 516 converts the electrical signal on line 514 to a corresponding optical signal representative of 40 Gbps serial data on a serial data optical signal line 518. In other embodiments, the optical fiber interface stage 516 converts an optical signal representative of 40 Gbps serial data on the serial data optical signal line 518 to a corresponding electrical signal on a line 514 connected to the data timing and reformatting stage 512.

In some embodiments, the 2.5 Gbps parallel electrical signal data lines 502 shown in FIG. 5 are input lines, the optical signal 518 is an output signal, and the optical transceiver component 500 is a transmitter. In other embodiments, the 2.5 Gbps parallel electrical signal data lines 502 are output lines, the optical signal 518 is an input signal, and the optical transceiver component 500 is a receiver. A transceiver comprising a transmitter having the topology shown in FIG. 5 and a receiver having the topology shown in FIG. 5 is illustrated in the block diagram of FIG. 6.

Figure 6:
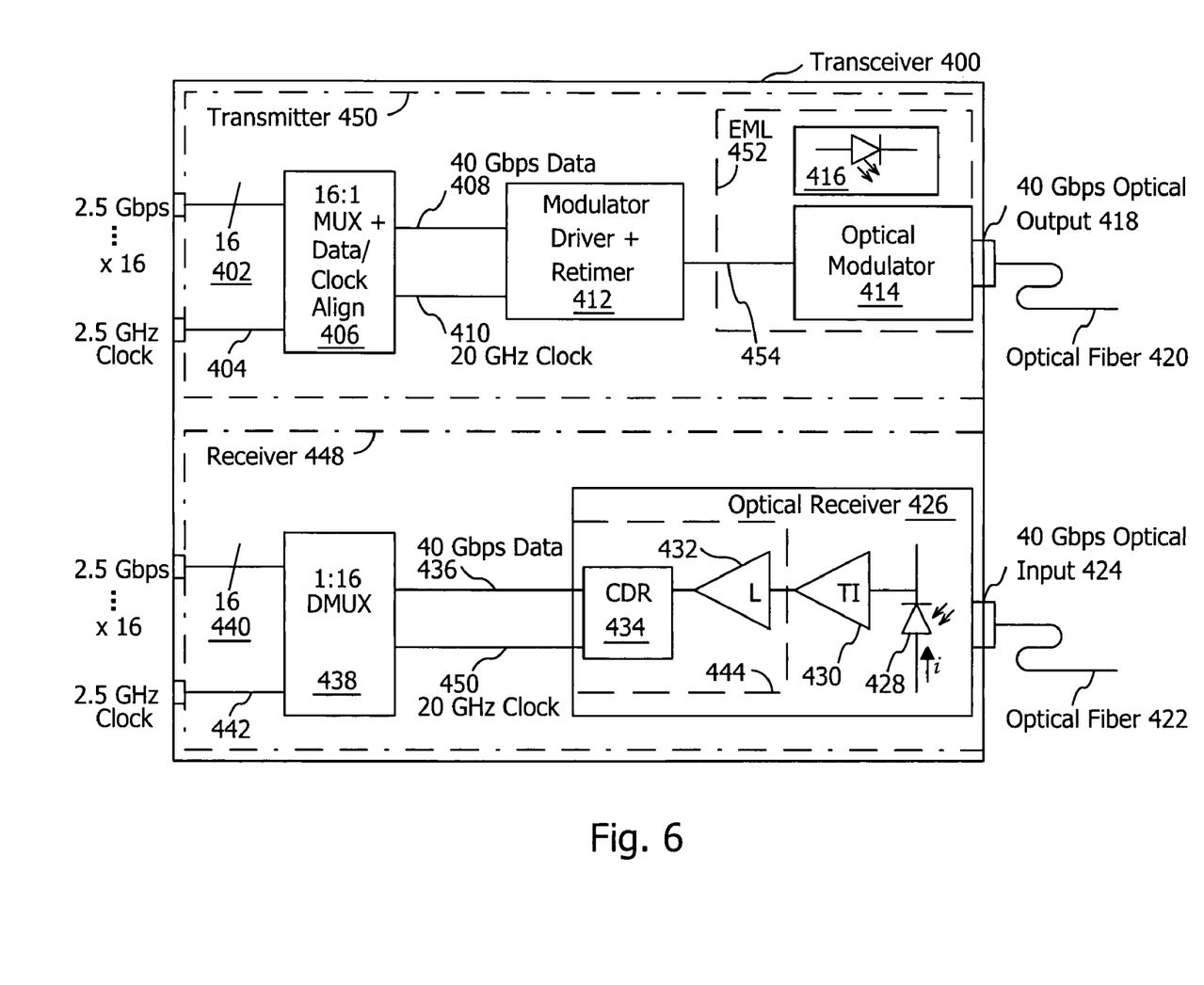
FIG. 6 is a block diagram of a 40 G transceiver comprising a 40 G transmitter and a 40 G receiver having topology in accord with an embodiment of the invention.

The transmitter 450 of FIG. 6 has inputs comprising a 2.5 GHz clock line 404 and sixteen parallel data lines 402, each data line able to carry digital data at a data rate of 2.5 Gbps. Transmitter 450 parallel data input lines 402 in FIG. 6 correspond to parallel data lines 502 in FIG. 5. The 2.5 GHz clock line 404 in FIG. 6 corresponds to the 2.5 GHz clock line 504 in FIG. 5. The parallel data lines 402 and clock line 404 are connected to inputs on a 16:1 MUX with data/clock alignment 406. The MUX 406 in FIG. 6 aligns data pulses on the data lines 402 with clock pulses on the 2.5 GHz clock input 404 and merges the sixteen parallel digital data inputs 402 into a serial data signal on 40 Gbps data line 408. The MUX 406 also outputs a 20 GHz clock signal on 20 GHz clock line 410. The 20 GHz clock signal on the clock line 410, referred to in the art as a single frequency signal, has relatively little jitter compared to signals on the 40 Gbps data line 408. In some embodiments, for example the embodiment of FIG. 7, a jitter filter 702 is connected to the 20 GHz clock line 410 and to the modulator driver and retimer 412. The jitter filter 702 reduces jitter in the clock signal input to the modulator driver and retimer 412. The design and construction of a jitter filter is well known in the art and will not be described herein.

Figure 7:
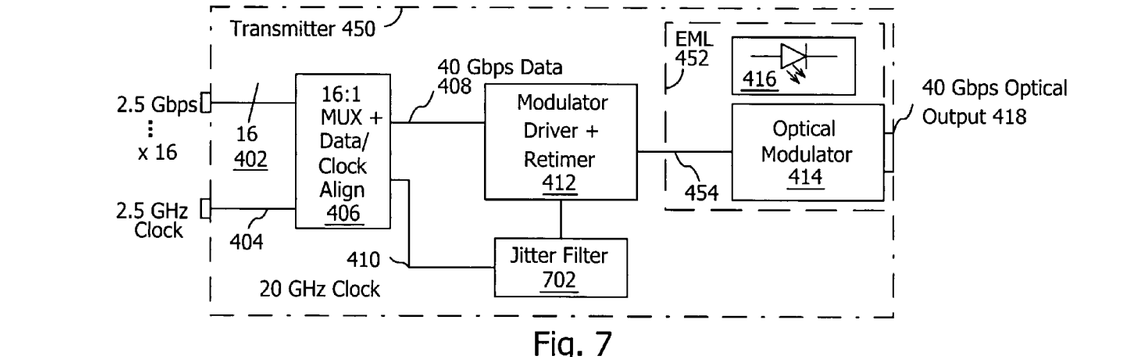
FIG. 7 is a block diagram of a 40 G transmitter having a data timing and reformatting stage comprising a jitter filter, a modulator driver, and a retimer.

The MUX 406 in FIG. 6 and FIG. 7 corresponds to the electrical signal interface stage 506 of FIG. 5. The 40 Gbps data line 408 in FIG. 6 and FIG. 7 corresponds to the 40 Gbps serial data signal line 508 in FIG. 5. The 20 GHz clock line 410 in FIG. 6 and FIG. 7 corresponds to the clock line 510 in FIG. 5. The modulator driver and retimer 412 and jitter filter 702 of FIG. 7 correspond to the data timing and reformatting stage 512 of FIG. 5. In general for the various embodiments of the invention described herein, an element and a connection between elements in the described embodiment corresponds to an element and a connection between elements in FIG. 5.

In FIG. 6, the 40 Gbps data line 408 and 20 GHz clock line 410 are connected to inputs on the modulator driver and retimer 412. A retiming circuit (also referred to herein and in FIG. 6 as a retimer) in the modulator driver and retimer 412 of FIG. 6 has the function of forming an output signal having pulses synchronized to a clock signal while accurately reproducing all of the data represented in the 40 Gbps data line 408. Output from the retimer therefore comprises 40 Gbps data corresponding to data input to the transmitter 450, converted from parallel to serial form and with jitter added by the MUX 406 removed. Data passing through the retimer may be referred to as retimed data. Because the retimer is located with the modulator driver, signals on the 40 Gbps serial data line 408 may have jitter in excess of SONET limits, that is, the signals need not be SONET compliant. The modulator driver portion of the modulator driver and retimer 412 converts the retimed 40 Gbps data signal into a drive waveform adapted for input to an optical modulator. Jitter in the output from the modulator driver and retimer 412 is essentially equal to the jitter in the clock signal on the 20 GHz clock line 410.

Figure 9:
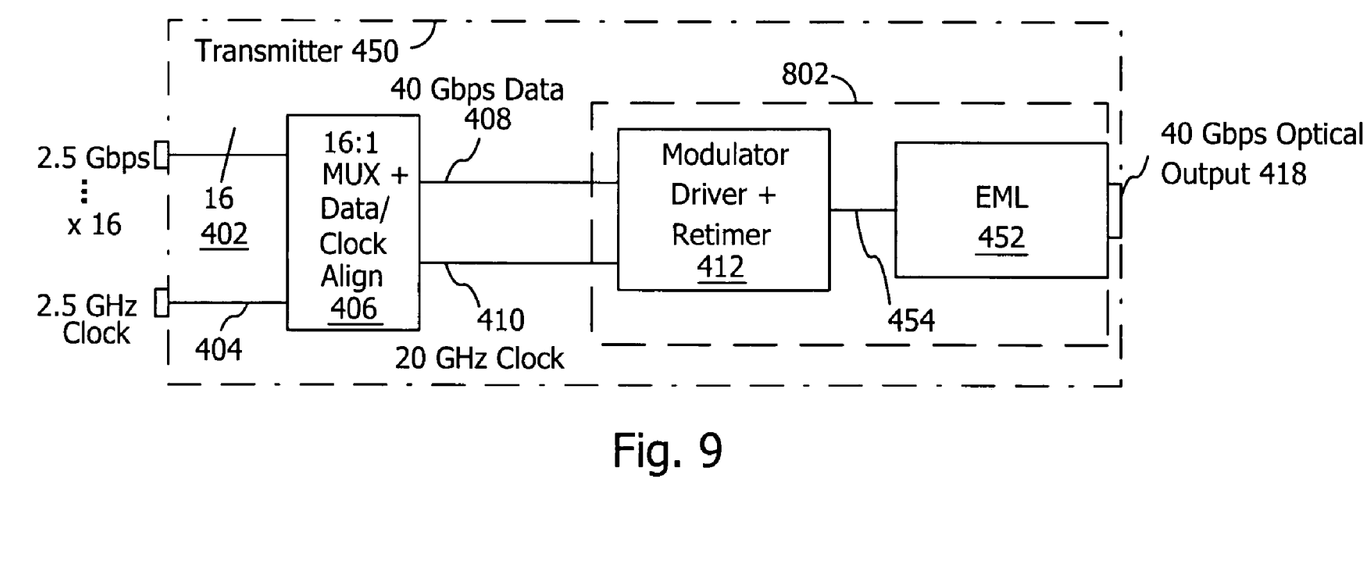
FIG. 9 is a block diagram of a 40 G transmitter having a data timing and reformatting stage comprising a modulator driver and retimer and an optical fiber interface stage comprising an EML, with both stages combined into one package.

The drive waveform output from the modulator driver and retimer 412 is on a line 454 connected to an input of an optical modulator 414. The optical modulator 414 modulates (i.e., varies the intensity of) light output from a laser diode 416 to create an output signal comprising light pulses corresponding to the retimed 40 Gbps serial data in the output of the modulator driver and retimer 412. Circuits for biasing and powering a laser diode are well known in the art and will not be described herein. The optical modulator 414 and laser diode 416 in FIG. 6 together correspond to the optical fiber interface 516 of FIG. 5 and the line 454 connecting the modulator driver 412 to the optical modulator 414 in FIG. 6 corresponds to the line 514 connecting the data timing and reformatting stage 512 and the optical fiber interface 516 in FIG. 5. In some embodiments, the laser diode 416 and optical modulator 414 of FIG. 6 are replaced with an EML 452. In some embodiments, for example the embodiment of FIG. 9, the EML 452 and the modulator driver and retimer 412 are placed together in one package 802. In other embodiments, the EML 452 in the package 802 may optionally be replaced with a laser diode and an optical modulator, as shown in the example of FIG. 7.

Figure 8:
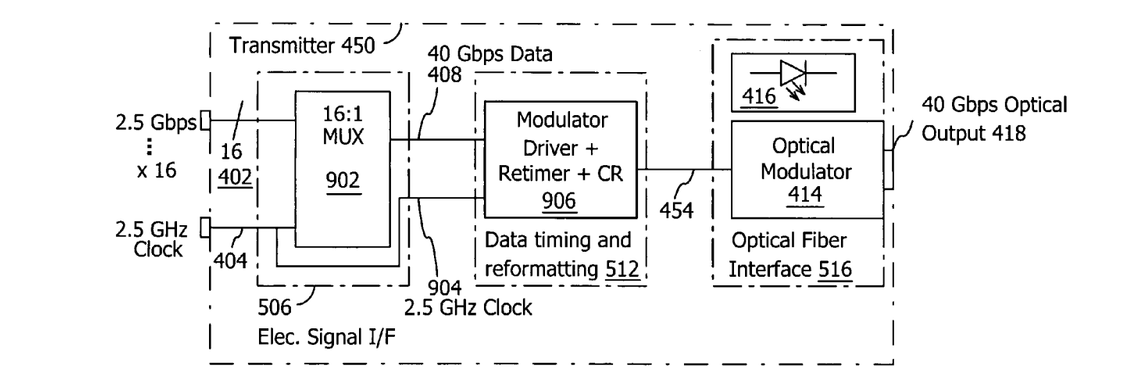
FIG. 8 is a block diagram of a 40 G transmitter having a data timing and reformatting stage comprising a modulator driver, a retimer, and a clock and data recovery function.

In some embodiments of a transmitter in accord with the invention, data/clock alignment functions are partitioned with the data timing and reformatting stage. In the example of FIG. 8, a data/clock alignment function, also referred to as clock recovery (CR) or clock and data recovery, is included in a modulator driver with retimer and CR 906. In the example of FIG. 8, the electrical signal interface stage 506 comprises a 16:1 MUX 902 that, unlike previously described embodiments, does not include a data/clock alignment function. A clock input to the modulator driver with retimer and CR 906 of FIG. 8 is a 2.5 GHz clock signal on clock line 904, corresponding to clock line 510 in FIG. 5. The 2.5 GHz clock line 904 may be connected to the 2.5 GHz clock signal input within the electrical signal interface stage 506 as shown, or may alternately be connected to a 2.5 GHz clock signal output of the 16:1 MUX 902. The optical fiber interface comprises the laser diode 416 and optical modulator 414, which may optionally be replaced with an EML 452 in the embodiment of FIG. 8 and in other embodiments of the transmitter 450.

The light signal output of the optical modulator 414 in FIG. 6, or alternately an output of an EML 452, is coupled to a 40 Gbps optical output 418. The 40 Gbps optical output 418 of the transmitter 450 comprises an optical output of the transceiver 400. The 40 Gbps optical output 418 is adapted for connection to an optical fiber 420. The embodiments of FIG. 7, FIG. 8, and FIG. 9 have similar 40 Gbps optical outputs 418 corresponding to the 40 Gbps serial data optical signal 518 of FIG. 5. The optical fiber 420, a small portion of which is shown for reference in FIG. 6, is part of a fiber optic network and is not a part of an embodiment of the invention. Jitter in the light signal from the optical modulator 414 is approximately equal to jitter in the clock signal used by the retimer in the modulator driver and retimer 412 and is much less than jitter in the 40 Gbps serial data line 408 from the MUX 406. Furthermore, since it is a relatively simple matter to control a maximum amount of jitter in the clock signal used by the retimer, and jitter in the transceiver's optical output (related to clock signal jitter as explained above) is related to production yield of the 40 G transceiver, it is possible to implement a selected value of clock signal jitter correlating to a selected value of production yield.

The receiver 448 of the transceiver 400 of FIG. 6 comprises a 40 Gbps optical input 424 adapted for connection to an optical fiber 422. The 40 Gbps optical input 424 in FIG. 6 corresponds to the 40 Gbps serial data optical signal 518 of FIG. 5. Light signals present at the 40 Gbps optical input 424 are coupled to an optical receiver 426, which converts the modulated received light signal into a corresponding 40 Gbps serial data output 436.

The optical receiver 426 comprises a photodetector 428 which detects light signals coupled into the optical receiver 426 at the 40 Gbps optical input 424. In some embodiments the photodetector 428 is a photodiode and in others the photodetector is a phototransistor. Circuits for biasing and powering the photodetector 428 are well known in the art and will not be described herein. Fluctuations in the amplitude of a current flowing through the photodetector 428 correspond to fluctuations in the intensity of the light signals detected from the fiber optic network. A transimpedance amplifier 430 outputs a voltage signal having amplitude proportional to current flowing through the photodetector 428. A limiting amplifier 432 applies a selected amount of gain to the output of the transimpedance amplifier 430 and outputs an electrical signal comprising serial data pulses to an input of a clock and data recovery circuit (CDR) 434. In some embodiments, the transimpedance amplifier 430 and the limiting amplifier 432 are combined in one integrated circuit. The CDR 434 outputs a digital electrical signal comprising 40 Gbps serial data to an output of the optical receiver 426 on a data line 436. The CDR also outputs a 20 GHz clock signal on a clock line 450.

In some embodiments, the photodetector 428, transimpedance amplifier 430, limiting amplifier 432, and CDR 434 are separately packaged devices within the transceiver 400 of FIG. 6. In these embodiments, the optical fiber interface 516 of FIG. 5 corresponds to a combination of the photodetector 428, the transimpedance amplifier 430, the limiting amplifier 432, and intervening signal connection lines shown in FIG. 6. Furthermore, the CDR 434 of FIG. 6 corresponds to the data timing and reformatting stage 512 of FIG. 5. In other embodiments, the limiting amplifier 432 and CDR 434 are packaged together in one device to reduce jitter compared to transceivers known in the art which combine a CDR with a DMUX. An optional combination of a limiting amplifier 432 and a CDR 434 in one package is shown in FIG. 6 by a boundary line 444 within the optical receiver 426, and in this embodiment, the combination 444 of FIG. 6 corresponds to the data timing and reformatting stage 512 of FIG. 5. For comparison to a receiver known in the art, an example of a CDR combined with a 1:16 DMUX 334 is shown in transceiver 300 illustrated in FIG. 3.

An output line 436 from optical receiver 426 in FIG. 6 carries 40 Gbps serial digital data to an input of 1:16 DMUX 438. The 20 GHz clock signal line 450 from the optical receiver 426 connects to a corresponding input on the DMUX 438, The DMUX 438 separates the 40 Gbps serial input data into sixteen parallel output data lines and a 2.5 GHz output clock signal, each output data line comprising 2.5 Gbps digital data corresponding to data received from the fiber optic network. The DMUX 438 may be fabricated from SiGe or other semiconductor materials suitable for high speed circuits.

Several of the functional elements shown in FIG. 6, for example the MUX 406, the modulator driver and retimer 412, the optical modulator 414, the CDR 434, and the DMUX 438 may each be implemented in many different alternative circuit configurations while still performing the functions described herein. These functionally equivalent alternatives will be familiar to one skilled in the art and are considered to be part of alternative embodiments of the invention.

The relative insensitivity of embodiments of the invention to jitter in outputs from semiconductor components, for example the MUX and DMUX, leads to desirable results that are contrary to expectations for 40 G transceivers known in the art. In 40 G transceivers known in the art, separation distances between transceiver components are selected to reduce jitter, interference, and other undesirable interactions between transceiver components in close proximity to one another. Reducing the size of a prior art 40 G transceiver by reducing the separation distances between components, or by reducing the size of individual components by, for example, reducing the die size of integrated circuits used in the components, is generally believed to cause increased jitter with correspondingly lower production yields.

In comparison to 40 G transceivers known in the art, a 40 G transceiver in accord with the invention may have substantially smaller separation distances between components. As previously discussed, some embodiments of the invention do not require connectorized packages, shielded connectors, or shielded cable assemblies to achieve jitter specifications in compliance with SONET standards, enabling further reductions in package size. A packaged 40 G transceiver in accord with the invention may therefore be substantially smaller in size than a 40 G transceiver known in the art, even though the sizes of semiconductor components inside both transceivers are about the same.

Figure 2:
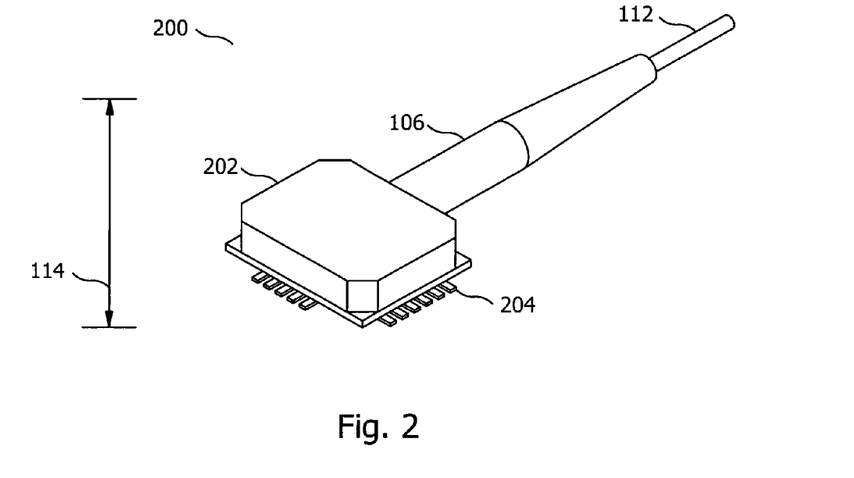
FIG. 2 is a pictorial view of a packaged 40 G transceiver component, for example a transmitter or a receiver, in accord with an embodiment of the invention.

An example of a 40 G receiver 100 in a connectorized package known in the art has been presented in discussions related to FIG. 1. An example of a 40 G receiver 200 in accord with embodiments of the invention is shown in FIG. 2. A reference line 114 in FIG. 1 and the corresponding reference line 114 in FIG. 2 represent a same reference distance and may be used to compare the size of the receiver 200 in FIG. 2 with the size of the receiver 100 known in the art. To further aid size comparisons, a fiber optic connector and strain relief 106 in FIG. 1 have a same length and a same diameter as a fiber optic connector and strain relief 106 in FIG. 2, although in practice either receiver may optionally use fiber optic connectors having other dimensions. One skilled in the art will appreciate that the package shown for the receiver 200 in FIG. 2, or a similar nonconnectorized surface mount package, may be used for a transmitter or other transceiver components. For an embodiment comprising a transmitter, the laser diode 416, optical modulator 414, or EML 452 of FIG. 6 may optionally be packaged separately from the other components in the transmitter 450.

The packaged embodiment of FIG. 2 has length, width, and height dimensions that are about half the corresponding dimensions for a transceiver component known in the art, for example the receiver 100 of FIG. 1. Accordingly, the surface mount package of FIG. 2 occupies about one-fourth (¼) the surface area of a connectorized package on a circuit card assembly. FIG. 2 illustrates one of many alternative surface mount ceramic packages that may be used with embodiments of the invention. Whereas the 40 G receiver 100 of FIG. 1 has a machined metal connectorized package with shielded connectors 108 for some high frequency signals and electrical contacts 110 which must be formed to a desired shape to solder the receiver to a circuit card assembly, high frequency signal and other electrical connections to the receiver 200 of FIG. 2 are made through surface mount contacts 204 which may be soldered to a circuit card assembly by automated equipment. Because of these and other differences apparent from an examination of FIGS. 1 and 2, embodiments of a 40 G component in accord with the invention are expected to have substantially lower manufacturing and installation costs than 40 G transceivers known in the art.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings.

What is claimed is:

1. A topology for a 40 G optical transceiver component having output jitter less than a SONET limit, comprising:
    an electrical signal interface stage;
    a data timing and reformatting stage;
    an optical fiber interface stage;
    a 40 Gbps serial data line connecting said electrical signal interface stage and said data timing and reformatting stage;
    a clock line connecting said electrical signal interface stage and said data timing and reformatting stage, wherein said clock line is adapted to carry a clock signal having an amount of clock signal jitter; and
    a signal line connecting said data timing and reformatting stage and said optical fiber interface stage,
    wherein said data timing and reformatting stage limits an amount of jitter coupled between said electrical signal interface stage and said optical fiber interface stage to an amount approximately equal to said amount of clock jitter on said clock line, said data timing and reformatting stage comprises a retimer adapted to reduce an amount of jitter in said signal line to an amount of jitter approximately equal to said amount of clock signal jitter, and said retimer is adapted to reduce an amount of jitter greater than the SONET limit on said 40 Gbps serial data line to said amount of jitter approximately equal to said amount of clock signal jitter.

2. The topology for a 40 G optical transceiver component of claim 1, wherein a maximum amount of jitter on said 40 Gbps serial data line is greater than the SONET limit.

3. The topology for a 40 G optical transceiver component of claim 2, wherein said data timing and reformatting stage further comprises a modulator driver.

4. The topology for a 40 G optical transceiver component of claim 3, wherein said data timing and reformatting stage further comprises a jitter filter.

5. The topology for a 40 G optical transceiver component of claim 3, wherein said optical fiber interface stage further comprises a laser diode and an optical modulator.

6. The topology for a 40 G optical transceiver component of claim 3, wherein said optical fiber interface stage further comprises an electro-absorptive modulator laser.

7. The topology for a 40 G optical transceiver component of claim 1, wherein a maximum value for an amount of jitter on said 40 Gbps serial data line is selected to increase a production yield of said multiplexer.

8. The topology for a 40 G optical transceiver component of claim 1, wherein said data timing and reformatting stage comprises a clock and data recovery function having a first output connected to said 40 Gbps serial data line and a second output connected to said clock line.

9. The topology for a 40 G optical transceiver component of claim 8, wherein said electrical signal interface stage further comprises a multiplexer.

10. The topology for a 40 G optical transceiver component of claim 9, wherein said optical fiber interface stage comprises a photodetector adapted to receive an optical signal from an optical fiber and a transimpedance amplifier adapted to amplify a current flowing through said photodetector.

11. The topology for a 40 G optical transceiver component of claim 10, wherein said data timing and reformatting stage further comprises a limiting amplifier adapted to amplify an output of said transimpedance amplifier.

12. A 40 G transceiver component having a topology adapted to limit jitter in a signal on an output line to an amount less than a SONET limit, comprising:
    a nonconnectorized surface mount package; and
    a modulator driver comprising:
        a data line adapted to carry a 40 Gbps data signal having a maximum amount of jitter greater than or equal to the SONET limit;
        a modulator driver output line;
        a clock line; and
        a retimer connected to said data line and said clock line, wherein said retimer is adapted to reduce an amount of jitter on said modulator driver output line to less than the SONET limit.

13. The 40 G transceiver component of claim 12, further comprising:
    an optical fiber interface having an optical output, wherein said optical fiber interface is connected to said modulator driver output line and said optical fiber interface is adapted to convert a signal representative of 40 Gbps data on said modulator driver output line to an optical signal on said optical output.

14. The 40 G transceiver component of claim 13, wherein said optical fiber interface further comprises a laser diode and an optical modulator.

15. The 40 G transceiver component of claim 13, wherein said optical fiber interface further comprises an electro-absorptive modulator laser.

16. A method for reducing jitter in an optical output of a 40 G transceiver component, comprising:
    selecting a limiting value of jitter;
    applying a serial digital data input signal having an amount of data signal jitter which includes an amount of output jitter from a MUX that is greater than a SONET limit, the amount of data signal jitter greater than the limiting value of jitter to an input of a modulator driver having a retimer;
    applying a clock signal having a selected amount of clock jitter less than the limiting value of jitter to an input of the modulator driver having a retimer;
    converting the serial digital data input signal to a retimed serial digital data signal output having a magnitude of jitter approximately equal to the selected amount of clock jitter; and
    converting the retimed serial digital data signal to an optical output signal.

17. The method for reducing jitter in an optical output of a 40 G transceiver component of claim 16, further comprising:
    selecting a maximum value of data signal jitter so as to increase a measurement of production yield for the 40 G transceiver component.

18. The method for reducing jitter in an optical output of a 40 G transceiver component of claim 16, further comprising:
    selecting a maximum value of data signal jitter so as to reduce a number of transceiver components that cause the jitter in an optical output of the 40 G transceiver component to exceed the limiting value of jitter.

* * * * *